United States Patent
Chung

(10) Patent No.: US 9,734,233 B2
(45) Date of Patent: Aug. 15, 2017

(54) MENU CONFIGURATION METHOD AND SYSTEM OF SMART DEVICE

(71) Applicant: NEOPAD, INC., Seoul (KR)

(72) Inventor: Hee Sung Chung, Seoul (KR)

(73) Assignee: Neopad, Inc., Seoul (KR)

( * ) Notice: Subject to any disclaimer, the term of this patent is extended or adjusted under 35 U.S.C. 154(b) by 450 days.

(21) Appl. No.: 14/369,557

(22) PCT Filed: Dec. 20, 2012

(86) PCT No.: PCT/KR2012/011126
§ 371 (c)(1),
(2) Date: Jun. 27, 2014

(87) PCT Pub. No.: WO2013/100480
PCT Pub. Date: Jul. 4, 2013

(65) Prior Publication Data
US 2014/0365496 A1 Dec. 11, 2014

(30) Foreign Application Priority Data
Dec. 27, 2011 (KR) .......................... 10-2011-143084

(51) Int. Cl.
*G06F 17/27* (2006.01)
*G06F 17/30* (2006.01)
(Continued)

(52) U.S. Cl.
CPC ...... *G06F 17/30598* (2013.01); *G06F 3/0482* (2013.01); *G06F 3/04817* (2013.01); *G06F 9/4443* (2013.01); *G06F 17/2785* (2013.01)

(58) Field of Classification Search
CPC .................................................. G06F 17/2785
(Continued)

(56) References Cited

U.S. PATENT DOCUMENTS

2002/0018080 A1\* 2/2002 Ageta .................. G06F 1/1616
715/810
2005/0165497 A1 7/2005 Tanabe
(Continued)

FOREIGN PATENT DOCUMENTS

JP 2003-216630 A 7/2003
JP 2003216630 A \* 7/2003
(Continued)

OTHER PUBLICATIONS

Office Action dated Sep. 15, 2015, issued in counterpart Japanese Patent Application No. 2014-549971 (4 pages).
(Continued)

*Primary Examiner* — Syling Yen
(74) *Attorney, Agent, or Firm* — Westerman, Hattori, Daniels & Adrian, LLP

(57) ABSTRACT

The present invention relates to a method and a system for configuring a menu in a smart device, which configure a menu of an application in a smart device, and the method of configuring a menu includes: collecting, by a smart device, information about one or more of a keyword, a title, and a tag of an application, and determining the collected information as a keyword for searching for a semantic menu, classifying the keyword determined by the smart device as a semantic menu, and displaying the classified semantic menu on the smart device. According to the present invention, there is an effect in that menu operability of a user and user convenience in searching for an application may be improved, and a user may manage an application based on User eXperience (UX).

38 Claims, 17 Drawing Sheets

(51) Int. Cl.
*G06F 3/0482* (2013.01)
*G06F 9/44* (2006.01)
*G06F 3/0481* (2013.01)

(58) Field of Classification Search
USPC ......... 707/791–793, 802–805, 999.101–102; 715/810
See application file for complete search history.

(56) References Cited

U.S. PATENT DOCUMENTS

| | | | |
|---|---|---|---|
| 2006/0242557 A1* | 10/2006 | Nortis, III | G06F 3/0482 715/234 |
| 2010/0240415 A1* | 9/2010 | Kim | G06F 3/03547 455/565 |
| 2012/0042008 A1* | 2/2012 | Christianson | G06F 17/30887 709/203 |
| 2012/0102145 A1* | 4/2012 | Jung | G06Q 30/02 709/217 |
| 2012/0116559 A1* | 5/2012 | Davis | G06F 3/002 700/94 |

FOREIGN PATENT DOCUMENTS

| | | |
|---|---|---|
| JP | 2008-305382 A | 12/2008 |
| WO | 2004-070598 A1 | 8/2004 |

OTHER PUBLICATIONS

Takakazu Shiomi et al., A Method of Clustering Documents Using Thesaurus, Multimedia Development Center, Matsushita Electric Industrial Co., Ltd., Jan. 21, 1997, vol. 97, No. 4, p. 99-104 (10 pages).

Office Action dated May 23, 2016, issued in counterpart Chinese Patent Application No. 201280065138.9. (9 pages).

Office Action dated Jan. 9, 2017, issued in counterpart Chinese Application No. 201280065138.9 with partial translation. (10 pages).

* cited by examiner

```
<!DOCTYPE html>
<html>
<head>
<meta charest="UTF-8"/>
<title> BASIS OF JQUERY </title>
.
.
.
</head>
```

FIG. 6

FILE SYSTEM

| KEYWORD | SEMANTIC MENU NAME 1 | SEMANTIC MENU NAME 2 | SEMANTIC MENU NAME 3 | SEMANTIC MENU NAME 4 | DATE WRITTEN |
|---|---|---|---|---|---|
| UTILITY | U | ROSE | KIM, 00 | DIRECT DESIGNATION BY USER | : : : |
| CHEONJIIN KOREAN | U | ROSE | KIM, 00 | | : : : |
| Input | U | ROSE | KIM, 00 | | : : : |
| . . . | . . . | | | | |
| NHN | N | LILY | PARK, 00 | | |
| Google | N | LILY | | | |
| Yahoo | N | LILY | | | |
| . . . | . . . | | | | |
| Music | M | CHERRY BLOSSOM | JUNG, 00 | | |
| GIRL'S GENERATION | M | CHERRY BLOSSOM | | | |
| KARA | M | CHERRY BLOSSOM | | | |
| . . . | . . . | | | | |
| Photo | A | AZALEA | LEE, 00 | | |
| Video | A | AZALEA | | | |
| . . . | . . . | | | | |
| To do menu | D | | | | |
| CITIBANK | P | FORSYTHIA | SHIN, 00 | | |
| VISA | P | | | | |
| . . . | . . . | | | | |
| Game | F | | | | |
| SNS | . | | | | |
| . . . | . . . | | | | |
| jQuery | E | SUNFLOWER | YANG, 00 | | |
| English | E | SUNFLOWER | | | |
| . | . | | | | |

MENU CONFIGURATION METHOD AND SYSTEM OF SMART DEVICE

CROSS REFERENCE TO RELATED APPLICATIONS

This is a National Stage of International Application No. PCT/KR2012/011126 filed Dec. 20, 2012, claiming priority based on Korean Patent Application No. 10-2011-0143084filed Dec. 27, 2011, the contents of all of which are incorporated herein by reference in their entirety.

DETAILED DESCRIPTION

Technical Field

The present invention relates to a method and a system for configuring a menu in a smart device, such as a smart phone, a smart pad, and a smart TV, and more particularly, to a method and a system for configuring a menu of a user application in a semantic menu scheme in a smart device.

BACKGROUND ART

Recently, information and communication terminals or content display devices have been developed to be smart according to convergence of various functions, and smart devices, which are generally classified as a smart phone, a smart pad, a smart TV and the like, have been widely supplied. One of the most useful advantages of the smart device is to enable a user to download and use an application (including an application program and contents) desired by the user.

A general application provider registers and sells an application in an application portal, which is called a market or a store. For example, approximately 800,000 applications are registered in the Apple Store, the Android Market, or the like by various registers. The user accesses the application portal by executing a web browser or an information search tool installed in a user's smart device, and searches for and downloads an application desired by the user, and installs the downloaded application in his/her smart device.

When the user of the smart device designates and downloads an application in a specific store or market, download of the application is started, and an icon of the completely downloaded application is displayed on a screen of the smart device of the user. The user may execute the downloaded application by activating the icon through a touch action, such as a tap.

In the meantime, as a use time of the smart device is increased, the number of applications downloaded to the smart device by the user, the number of sites accessed by the user, the amount of information accumulated through the search, and the like are massive. Particularly, as the number of applications downloaded to the smart device by the user is increased, it is difficult for the user to manage the downloaded applications.

For example, it is known that the average number of applications downloaded by a general user of a smart phone is approximately 100. Further, whenever an application is downloaded, an icon of the corresponding application is downloaded together with the application, and the icons configure a main menu in the smart device of the user. The applications downloaded by a general user of the smart device include various types, such as a game, music, schedule management, and icons thereof also have various shapes.

FIG. 1 illustrates a display of menus of icons of applications in a smart phone. As illustrated in FIG. 1, in a current smart device, when various applications are downloaded, icons are displayed on the smart device without semantic classification. In this case, in FIG. 1, icons, such as "social media", "finance", and "Internet TV", are folders in which a plurality of applications is grouped, and a user of a smart device may manually classify icons into group menu configurations by using the folder function in the related art.

Further, FIG. 2 illustrates a specific information list within sites bookmarked with a bookmark function by a user in a PC. The bookmark list is also manually configured through the bookmark function illustrated in FIG. 2 in the related art, so that this is similar to the configuration of the folder by manually grouping the icons by the user in FIG. 1.

However, as the number of icons of the downloaded applications is increased, understanding or recognition of the user for contents of the applications may be degraded, and menus are disorderly formed in the smart device. That is, there is a problem in that as the number of downloaded applications is increased, utility of the applications by the user is considerably decreased in a simple menu configuration environment in the related art.

DISCLOSURE

Technical Problem

An object of the present invention is to provide a method and a system for configuring a menu in a smart device, in which a menu of an application is configured by utilizing a semantic scheme in a smart device, so that menus of applications and the like accumulated in the smart device may be intelligently classified and configured, and a user may have improved menu operability, and efficiently manage and search for an application.

Technical Solution

An exemplary embodiment of the present invention provides a method of configuring a menu in a smart device, which configures a menu of an application in a smart device including an information and communication terminal or a content display terminal, including: (a) accessing, by the smart device, a specific place; (b) connecting an application designated or download-requested by the smart device to the smart device from the specific place; (c) collecting, by the smart device, information about one or more among a keyword, a title, and a tag of the application, and determining the collected information as keywords for searching for a semantic menu; (d) classifying, by the smart device, the determined keywords, as the semantic menu; and (e) displaying the classified semantic menu on the smart device.

The smart device may include any one of a smart phone, a smart pad, a smart TV, a PC, an IPTV, a navigation device, and an information and communication terminal having a computer function.

The specific place may include any one of a web site, an application market, a store, a content storage place, and a web service site.

Operation (a) of accessing, by the smart device, the specific place may be performed through wired network access, wireless network access, or complex access of a wired network and a wireless network.

Operation (a) of accessing, by the smart device, the specific place may be performed by any one input method among a voice recognition input method, a text input method, and a touch input method.

Operation (b) of connecting the application designated or download-requested by the smart device to the smart device from the specific place may be achieved by designating the application of the specific place or downloading the application, of which the download is requested by the smart device, to the smart device from the specific place by using any one function of a bookmark, a bookmark view, and a bookmark execution of the smart device.

The application may include at least one of application software, a web application, a web service, a game, music, a picture, a video, text data, and computer processible contents.

Operation (c) of collecting information about the one or more among the keyword, the title, and the tag of the application may be achieved by collecting the information about one or more of the keyword, the title, and the tag from a title name provided together with an icon of the application, or a classification directory name or an explanatory note provided by an application provider.

Operation (c) may include: (c-1) morpheme-processing the title name or the classification directory name; and (c-2) determining a noun word obtained through the morpheme-processing as the keyword for searching for the semantic menu.

Operation (c) may include: (c-1) opening the explanatory note; (c-2) obtaining the title name, the classification directory name, or a keyword tag of the application by looking up the explanatory note; (c-3) morpheme-processing the obtained title name, classification directory name, or keyword tag; and (c-4) determining a noun word obtained through the morpheme-processing as the keyword for searching for the semantic menu.

Operation (d) of classifying, by the smart device, the determined keywords, as the semantic menu may include: (d-1) opening a semantic menu dictionary; (d-2) looking up the semantic menu dictionary by using the keyword determined in operation (c) as a search keyword; (d-3) extracting a semantic menu name matched to the search keyword from the semantic menu dictionary; and (d-4) configuring a semantic menu file system by including the application in the extracted semantic menu name element.

The semantic menu dictionary may be established in a TRIE structure including at least an information element of the keyword of the application, a semantic menu name group, of which designation is available by the user, and a semantic menu writing date.

The information about the semantic menu writing date may be usable as attribute information indicating a use history of the application by the user.

The configuring of the semantic menu file system in operation (d-4) may be implemented in a tree structure or a network structure. The number of semantic menu names may be 7 to 12.

A lock release function of limiting and releasing access to the semantic menu may be added to the semantic menu displayed by operation (e).

The lock release function may be provided so as to select an entire lock for the entire semantic menus, a partial lock for partially selected menus among the semantic menus, and an individual lock for an individual semantic menu.

The lock release function may be provided by any one method among a pattern method, in which the semantic menu is locked and released by a specific pattern, a password method, in which the semantic menu is locked and released by a password input, and a bio-signal method, in which the semantic menu is locked and released by a bio-signal, such as a voice or a fingerprint.

Operation (e) may include: (e-1) displaying the semantic menu in a form of a semantic menu icon; and (e-2) displaying the semantic menu icon on the smart device.

Operation (e-1) may include displaying semantic menu icons on the smart device, and displaying an icon designated by the user as a semantic menu icon of a specific semantic menu.

The semantic menu icon may be configured in a form of a graphic drawing or a picture, and be provided to have a shape and a size selected by the user.

Another exemplary embodiment of the present invention provides a system for configuring a menu in a smart device, which configures a menu of an application in a smart device for an application designated or download-requested by the smart device including an information and communication terminal or a content display terminal by accessing a specific place, wherein the smart device includes: a download management module configured to designate an application or request download of an application from the specific place, and manage the designated or downloaded application; a keyword extraction module configured to collect information about one or more of a keyword, a title, and a tag of the application, and determine the collected information as keywords for searching for a semantic menu; a semantic menu classification module configured to classify the semantic menu by using the keyword extracted by the keyword extraction module; and a semantic menu display module configured to display the semantic menu classified by the semantic menu classification module on the smart device.

The smart device may include any one of a smart phone, a smart pad, a smart TV, a PC, an IPTV, a navigation device, and an information and communication terminal having a computer function.

The specific place may include any one of a web site, an application market, a store, a content storage place, and a web service site.

The accessing, by the smart device, to the specific place may be performed through wired network access, wireless network access, or complex access of a wired network and a wireless network.

The accessing, by the smart device, to the specific place may be performed by any one input method among a voice recognition input method, a text input method, and a touch input method.

The download management module may designate the application of the specific place or request and perform download of the application from the specific place by using any one function of a bookmark, a bookmark view, and a bookmark execution.

The application may include at least one of application software, a web application, a web service, a game, music, a picture, a video, text data, and computer processible contents.

The keyword extraction module may collect the information about one or more of the keyword, the title, and the tag from a title name provided together with an icon of the application from the specific place, or a classification directory name or an explanatory note provided by an application provider.

The keyword extraction module may morpheme-process the title name or the classification directory name, and extract the keyword for searching the semantic menu.

The keyword extraction module may obtain the title name, the classification directory name, or a keyword tag of the application from the explanatory note, morpheme-process the obtained title name, classification directory name, or keyword tag of the application, and extract the keyword for searching for the semantic menu.

The semantic menu classification module may look up the semantic menu dictionary by using the keyword extracted by the keyword extraction module as a search keyword, extract a semantic menu name matched to the search keyword from the semantic menu dictionary, and configure a semantic menu file system.

The semantic menu dictionary may be established in a TRIE structure including at least an information element of the keyword of the application, a semantic menu name group, of which designation is available by the user, and a semantic menu writing date.

The information about the semantic menu writing date may be usable as attribute information indicating a use history of the application by the user.

The semantic menu classification module may configure the semantic menu file system in a tree structure or a network structure.

The number of semantic menu names may be 7 to 12.

The semantic menu display module may have a lock release function of limiting and releasing access to the semantic menu.

The lock release function may be provided so as to select an entire lock for the entire semantic menus, a partial lock for partially selected menus among the semantic menus, and an individual lock for an individual semantic menu.

The lock release function may be provided by any one method among a pattern method, in which the semantic menu is locked and released by a specific pattern, a password method, in which the semantic menu is locked and released by a password input, and a bio-signal method, in which the semantic menu is locked and released by a bio-signal, such as a voice or a fingerprint.

The semantic menu display module may display the semantic menu in a form of a semantic menu icon, and display the semantic menu icon on the smart device.

The semantic menu display module may display an icon designated by the user as a semantic menu icon of a specific semantic menu.

The semantic menu icon may be configured in a form of a graphic drawing or a picture, and be provided to have a shape and a size selected by the user.

Effect of the Invention

According to the present invention, the menu of an application is configured by a semantic method in a smart device, so that there is an effect in that menus of applications accumulated in the smart device may be intelligently classified and configured, and menu operability of a user and user convenience in searching for an application may be improved, and a user may manage an application based on User eXperience (UX).

Further, according to the present invention, it is possible to individually lock and release a semantic menu, so that a user may set multi-level security for a semantic menu having high importance, and set a security function only for a semantic menu having high importance while using without locking other functions (for example, a call function) of a smart device, thereby achieving user-oriented application management.

DESCRIPTION OF DRAWINGS

FIG. 6 is a diagram illustrating an example of an explanatory note of an application written with HTML.

FIG. 12 is a diagram illustrating an example of a semantic menu dictionary in a form of a table.

BEST MODE

Figure 1:
FIG. 1 is a diagram illustrating an example of a menu display on a smart phone in the related art.
Figure 2:
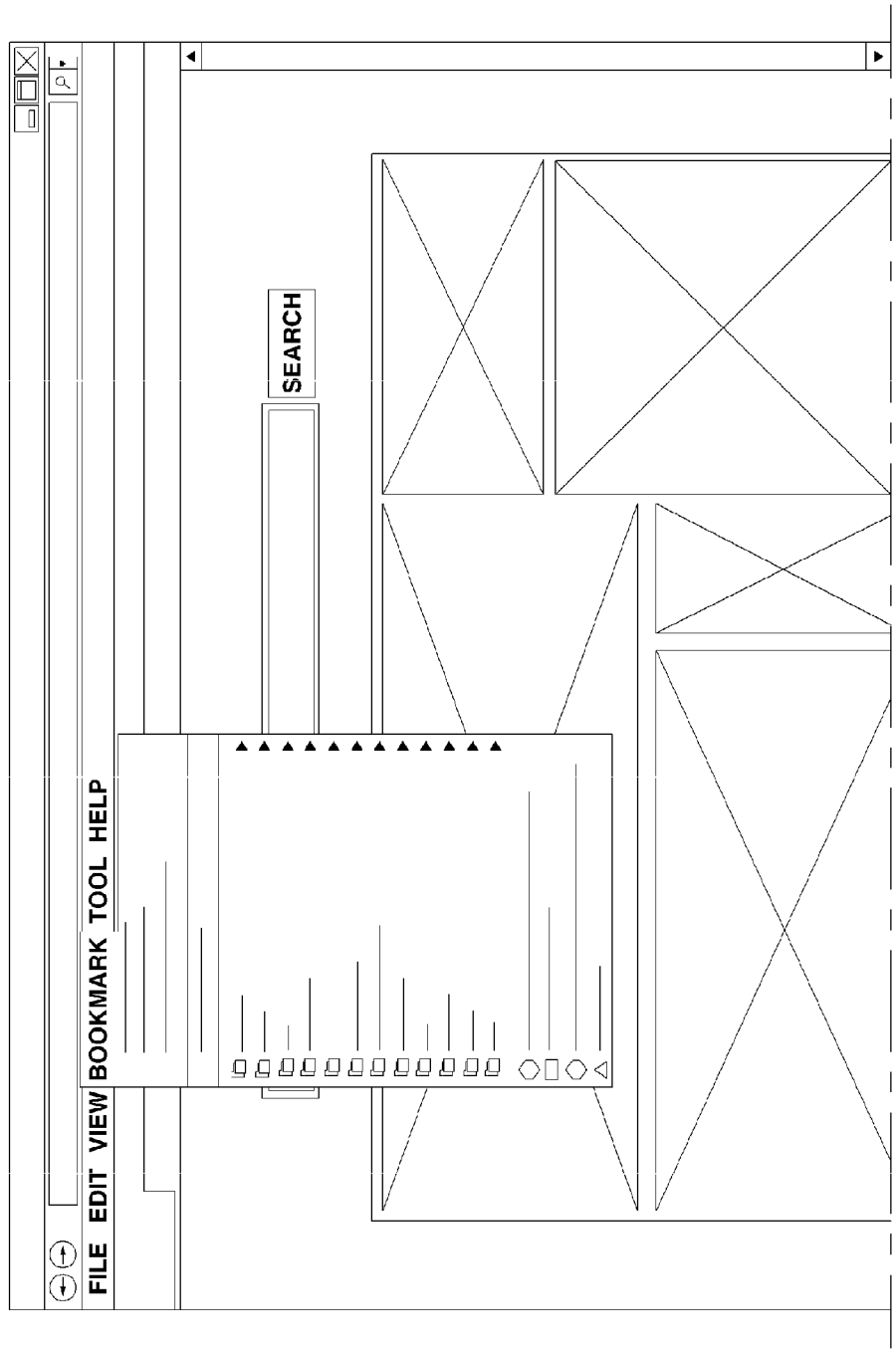
FIG. 2 is a diagram illustrating an example of a bookmark menu display on a PC in the related art.

Hereinafter, a specific embodiment according to the present invention will be described with reference to accompanying drawings. However, it is not intended to limit the present invention to a specific embodiment, and it will be appreciated that the present invention includes all modifications, equivalences, or substitutions included in the spirit and the technical scope of the present invention.

Similar configurations and operations are given the same reference numerals throughout the specification. Further, the accompanying drawings of the present invention are for convenience of description, and shapes and relative scales thereof may be exaggerated or omitted.

In the detailed description of the exemplary embodiment, overlapping descriptions or description of a technology apparent in the art will be omitted. In addition, unless explicitly described to the contrary, the word "comprise" and variations such as "comprises" or "comprising", will be understood to imply the further inclusion of elements, in addition to stated elements.

In addition, the terms "-er", "-or", "module", and the like described in the specification mean units for processing at least one function and operation and may be implemented by hardware components or software components or combinations thereof. Further, when it is described that an element is "coupled" to another element, the element may be "directly coupled" to the other element or "coupled" to the other element with a third element interposed therebetween.

The present invention relates to a method and a system for configuring a menu in a smart device, which intelligently and meaningfully classify various applications by using a semantic scheme, and configure and display a semantic menu, unlike a scheme of meaninglessly classifying an application menu and manually grouping the application menu by a user in a smart device in the related art. The method and the system for configuring a menu in a smart device of the present invention configure a menu of an application in a smart device, such as an information and communication terminal or a content display terminal.

Here, the "smart device" is understood to include a PC, an IPTV, a navigation device, and other information and communication terminals including a computer function, to which the technical spirit of the present invention is applied, in addition to a terminal, such as a smart phone, a smart pad, a smart TV which are generally called a smart device. Further, an "application" is defined as an application having a broad sense meaning including a web application, a web service, a game, music, a picture, a video, text data, and computer processible contents, as well as an application having a narrow sense, such as application software.

Figure 3:
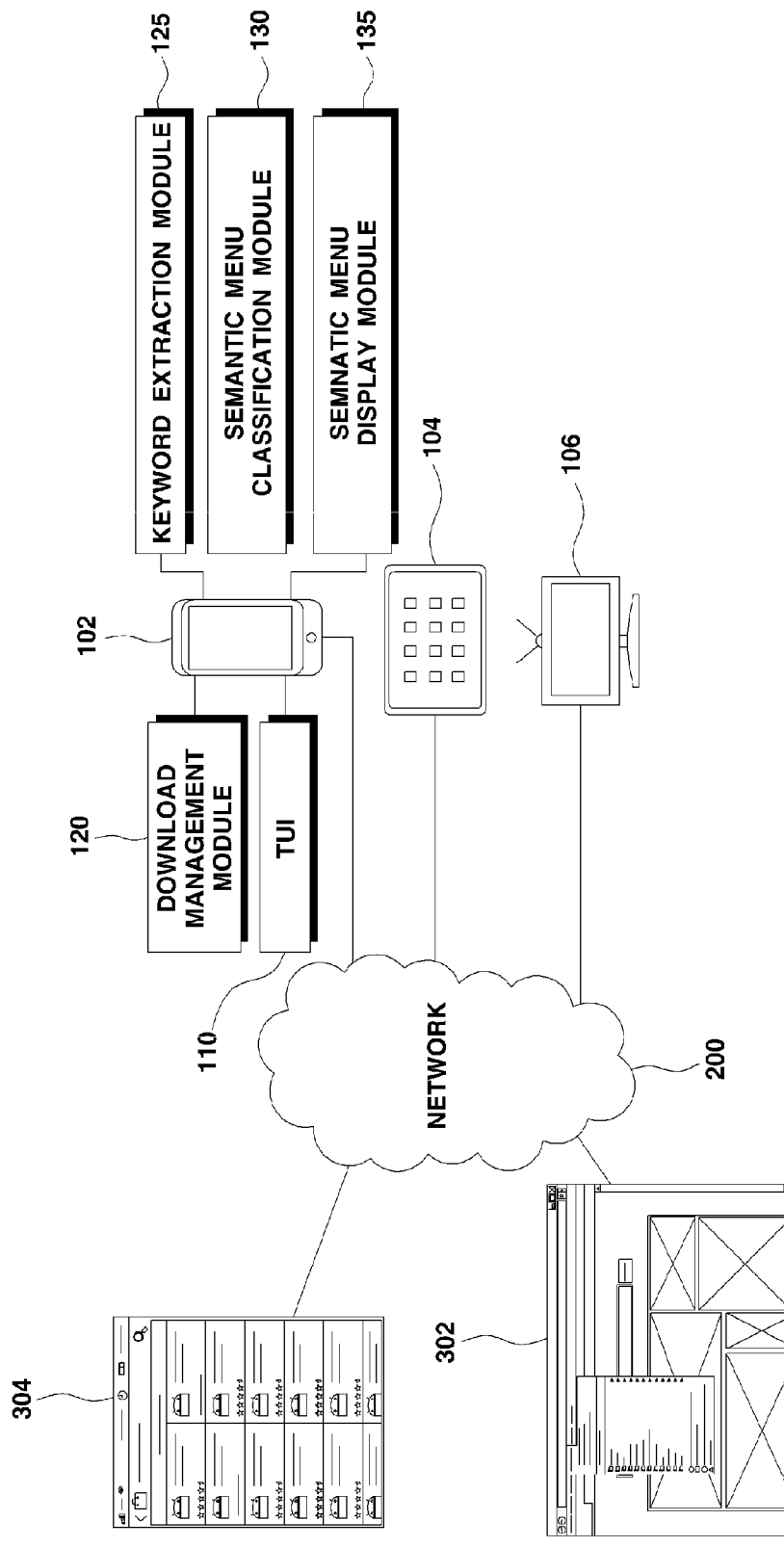
FIG. 3 is a block diagram illustrating an example of a menu configuration system according to the present invention.

FIG. 3 is a block diagram illustrating an example of a menu configuration system in a smart device according to the present invention. Referring to FIG. 3, a smart device, such as a smart phone 102, a smart pad 104, and a smart TV 106, may access a specific place, such as a web site 302 or an application market 304, through a network 200.

Here, the network is a wired network, a wireless network, or a network in which a wired network and a wireless network are complexly configured. Further, the "specific place" includes a store, a content storage place, a web service site, and the like, as well as the web site 302 and the application market 304 which the smart device may access. That is, the specific place means a place which provides a user with the application through the network 200.

The smart device accesses a specific place through the network 200, and designates an application or requests download of a specific application. Further, a menu for the designated or download requested application is configured in the smart device.

Referring to FIG. 3, the smart device includes a download management module 120, a keyword extraction module 125, a semantic menu classification module 130, and a semantic menu display module 135. Further, the smart device includes a touch user interface 110 selectively supporting a touch input.

An input method of the smart device is not limited to a touch input method. For example, the designation or the download request of the application may be performed by a text input method by a physical keypad or, a keyboard, or the like, a voice recognition input method, or the like. That is, although not illustrated, the smart device may additionally include a key input interface, a voice recognition interface, and the like. Further, in addition to this, other types of input interface may also be included. Further, only any one among the enumerated input methods may be selectively included.

The download management module 120 designates an application or requests the download of an application from a specific place, and manages the designated or downloaded application.

As an example of the designation of the application, the download management module 120 in the smart pad 104 or a PC designates a specific web page and the like of the web site 302 by using a bookmark function. As another example, the download management module 120 in the smart TV 106 designates specific channels by using a bookmark view function. As another example, the download management module 120 designates specific applications, such as music or a video, by using a bookmark execution function in the smart phone 102 or a content display terminal (for example, the iPod and the Galaxy player).

As an example related to the download of the application, the download management module 120 requests the download of an application selected by the user among various applications disclosed in the application market 304, downloads the corresponding application, and stores the downloaded application at a predetermined storage position. Further, the download management module 120 outputs information, such as an icon or an explanatory note, of the downloaded application on a screen.

The keyword extraction module 125 collects any one among a keyword, a title, and a tag of an application or complexly collects the information, and determines the collected information as a keyword for searching for a semantic menu. For example, the keyword extraction module 125 extracts a title or a keyword from a title name provided together with an icon of the application. Otherwise, the keyword extraction module 125 may extract a keyword from a tag of the application. For example, the keyword extraction module 125 may extract a keyword from a classification directory name or an explanatory note provided by an application provider.

The keyword extraction module 125 obtains a noun word by morpheme-processing the keyword extracted by the aforementioned method, and determines the obtained noun word as the keyword for searching for the semantic menu. The keyword extracted and determined as described above is used for semantic menu classification.

The semantic menu classification module 130 classifies a semantic menu by using the keyword extracted and determined by the keyword extraction module 125. As an exemplary embodiment, the semantic menu classification module 130 uses a semantic menu dictionary 310 for the semantic menu classification. The semantic menu dictionary 310 is configured in a TRIE structure including an information element, such as a keyword of an application, a semantic menu name group, and a semantic menu writing date. Here, the semantic menu name group may be designated by the user. That is, attributes of the semantic menu name and groups may be designated as desired by the user. Further, the semantic menu writing date may be used as attribute information indicating a use history of the application of the user. The large number of elements of the semantic menu writing date information means that the user frequently uses the application.

For example, the semantic menu classification module 130 looks up the semantic menu dictionary 310 by using the keyword extracted and determined by the keyword extraction module 125 as a search keyword. Further, the semantic menu classification module 130 extracts a semantic menu name matched to the search keyword from the semantic menu dictionary 310, and configures a semantic menu file system. The semantic menu file system is configured in a tree structure or a network structure.

The semantic menu display module 135 displays the semantic menu classified by the semantic menu classification module 130 on the screen of the smart device. The semantic menu display module 135 provides a lock release function for the semantic menu in the display of the semantic menu. The lock release function may adopt one of various schemes, such as a pattern scheme, a password scheme, a biometric signal scheme, such as a voice or a fingerprint, and the like. Further, in the semantic menu lock release, an entire lock for the entire semantic menus, a partial lock for a part of the semantic menus, and an individual lock for an individual semantic menu are selectively provided.

Hereinafter, the method of configuring the menu in the smart device according to the present invention, and detailed exemplary embodiments will be described in detail with reference to the flowchart of FIG. 4 and the exemplary embodiments disclosed in the subsequent drawings of FIG. 4.

Figure 4:
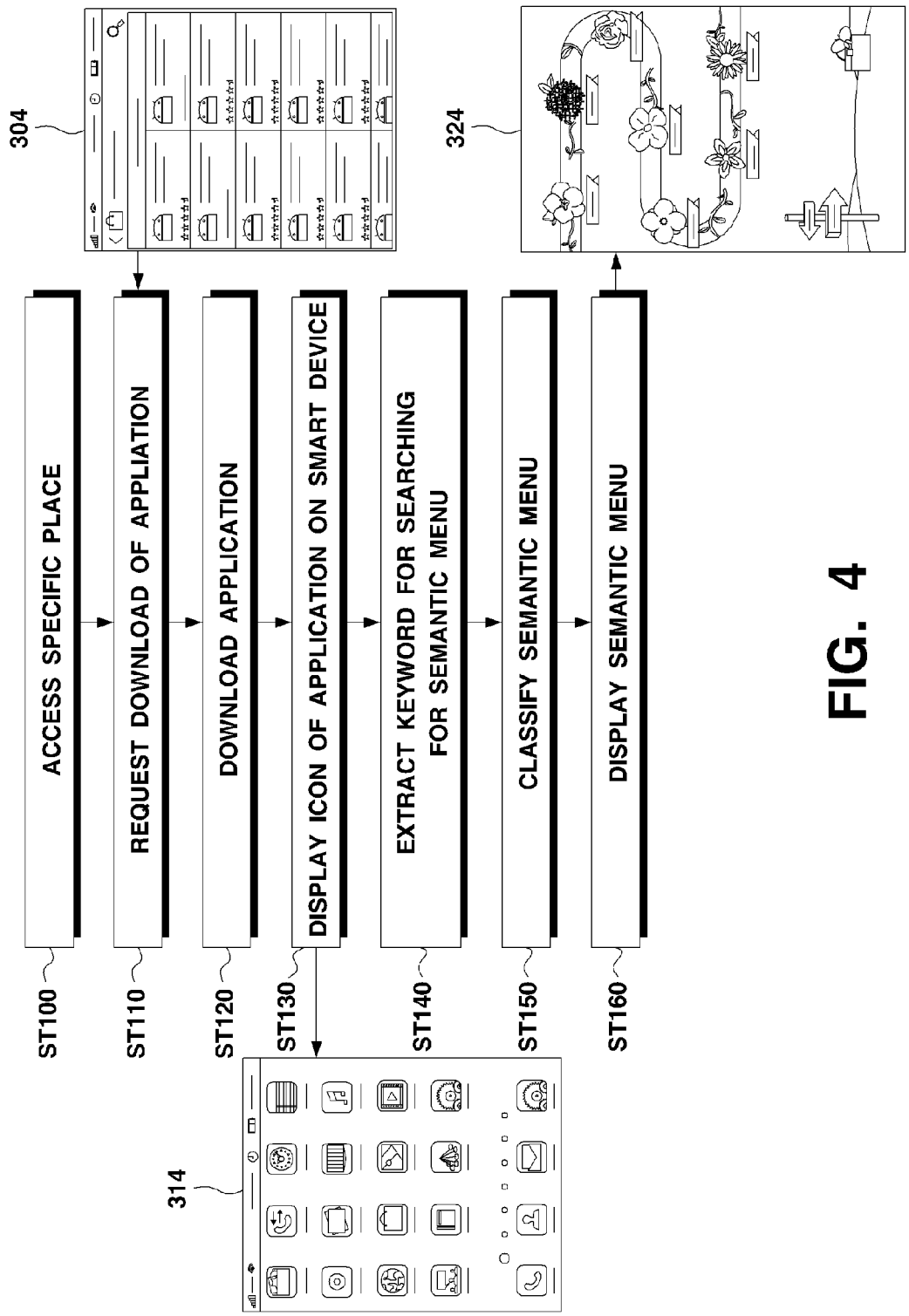
FIG. 4 is a flowchart illustrating an example of a menu configuration method according to the present invention.

Referring to FIG. 4, an operation of accessing, by the smart device, a specific place is started (ST100). In the example of FIG. 4, the specific place is the application market 304. As an example, the user accesses the application market 304 through a network service, such as WiFi, global system for mobile communication (GSM), code division multiple access (CDMA), wideband code division multiple access (WCDMA), and long term evolution (LTE), provided by the smart phone 304. As another example, the user may also access a specific broadcasting channel or a specific web site through a wired network in a smart TV or a general home PC. A wired network and a wireless network may be complexly used during a process of accessing the specific place by the smart device as a matter of course.

In a next operation, the smart device designates an application or requests download of an application from the specific place (ST110). Like the example of FIG. 3, when the touch user interface 110 is installed in the smart phone 102, the user taps (an event generated when the user touches the screen with one finger, and then immediately lifts up the finger from the screen without moving the finger) a desired application with a touch in the application market 304. The request for the download of the application is performed by a touch gesture. The designation of the application is executed by, for example, the aforementioned bookmark, bookmark view, and bookmark execution.

When the download of the application is requested in operation ST110, the application is downloaded in a next operation (ST120). The download of the application is performed through the aforementioned wired or wireless network 200.

When the designation or the download of the application is completed, the download management module 120 displays the completely designated or downloaded application on the smart device (ST130). FIG. 4 illustrates an example of an application icon display screen image 314 in the smart phone 102.

Operations ST110 to ST130 are substantially the same as the download of the application and the display of the icon of the downloaded application which are performed in the smart device in the related art.

In the method of configuring the menu of the present invention, the keyword extraction module 125 extracts a keyword for searching for a semantic menu from the designated or downloaded application in a next operation (ST140). Further, the semantic menu classification module 130 classifies the semantic menu with the extracted keyword (ST150). The semantic menu display module 135 displays the classified semantic menu on the screen of the smart device (ST160). In FIG. 4, a semantic menu display screen image 324 finally displayed on the screen by operation ST160 is exemplified.

Specific embodiments of operations ST140 to ST160 will be described in detail below.

Figure 5:
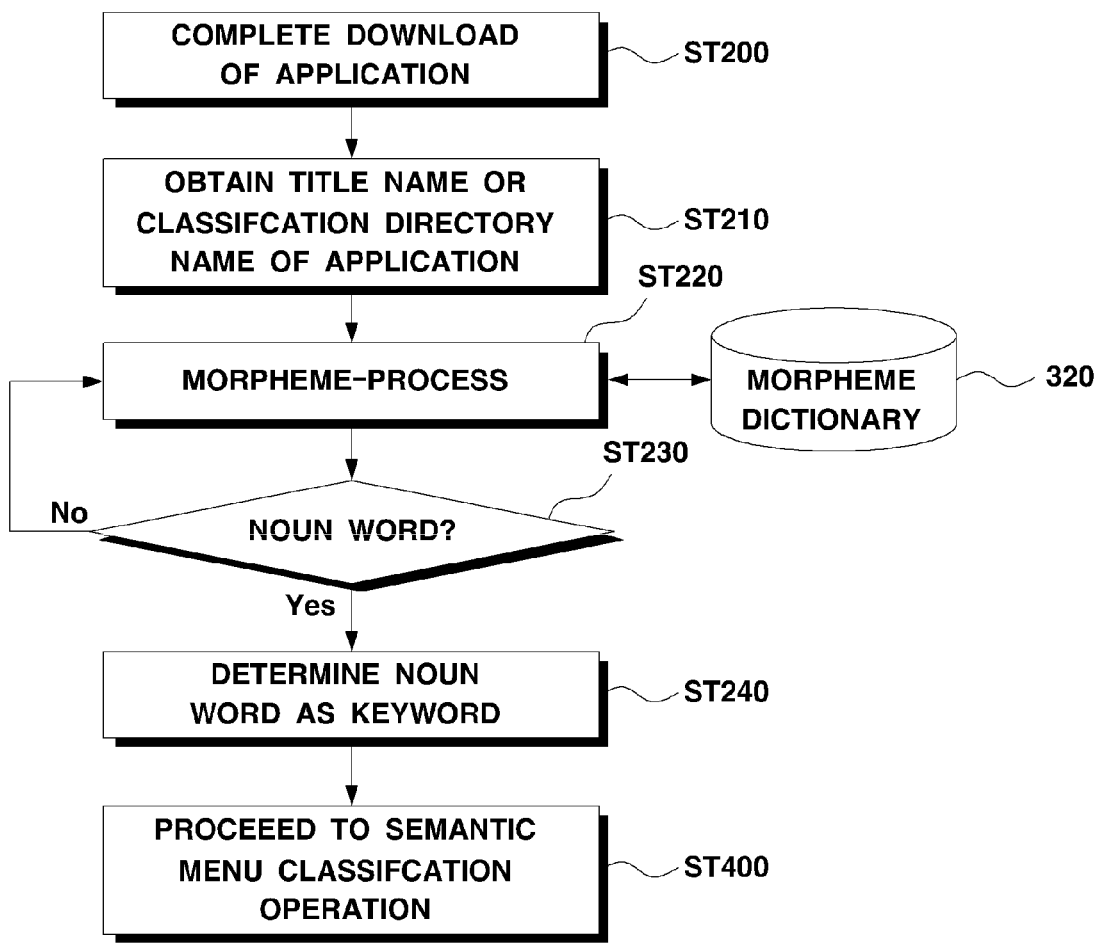
FIG. 5 is a flowchart illustrating an example of a process of extracting a keyword in the present invention.

FIG. 5 is a flowchart illustrating an example of a process of extracting a keyword in the present invention. Referring to FIG. 5, when the download (or designation) of the application is completed (ST200), the keyword extraction module 125 then obtains a title name or a classification directory name of the application (ST210).

The title name of the application is generally provided together with an icon of the corresponding application during the download of the application. The classification directory name of the application is provided by the application provider.

The keyword extraction module 125 morpheme-processes the obtained title name or classification directory name (ST220). Further, the keyword extraction module 125 determines whether the morpheme-processed word is a noun word (ST230). The morpheme-processing generally uses a commonly used morpheme engine used as a tool for analyzing a sentence form of the Korean language. The morpheme engine includes an electronic dictionary configured with parts of speech and the like for words for each language as basic information, and for example, the electronic dictionary is a morpheme dictionary 320 exemplified in FIG. 5.

When the processed word is not the noun word in operation ST230, the method returns to operation ST220 to morpheme-process another collected keyword again. When it is confirmed that the processed word is the noun word in operation ST230, the keyword extraction module 125 determines the corresponding keyword as the keyword of the corresponding application (ST240). Then, the method moves to a semantic menu classification operation (ST400).

Here, the title name of the application displays the usage of the application in most cases, but some of the title names may be proper names of applications. In this case, it is difficult to determine the type and the usage of the corresponding application with the title name of the application. In the meantime, according to the classification directory name of the application, the usage of the application is customarily objectified to classify the application, so that in order to classify the semantic menu according to the present invention, the classification directory name of the application may be more advantageous to extract the keyword. However, the classification directory name of the application may also be set through subjective classification of the application provider, so that the classification directory name of the application may be contrary to the purpose of the present invention for configuring the semantic menu by a user. Further, in a case of some applications, a title name or a classification directory name of the application may not be separately provided.

The method of configuring the menu of the present invention provides a method of extracting a keyword from an explanatory note of an application in order to solve the aforementioned problem. In general, an application accompanies a general document in a form of a table or an explanatory note written with a mark-up language, such as an HTML. Further, when the keyword is extracted from the explanatory note, there is an advantage in that a subjective determination of an application provider may be excluded, and a menu name familiar to a user may be extracted.

FIG. 6 illustrates an example of an explanatory note of an application written with HTML. Referring to FIG. 6, a value of an element tag attribute title is "basis of jQuery". The title value is easily searched and obtained. The title value may be a word or a sentence, and only a word, of which a part of speech is noun may be extracted from the title value through the morpheme-processing in the future and the extracted word may be utilized as a keyword.

Figure 7:
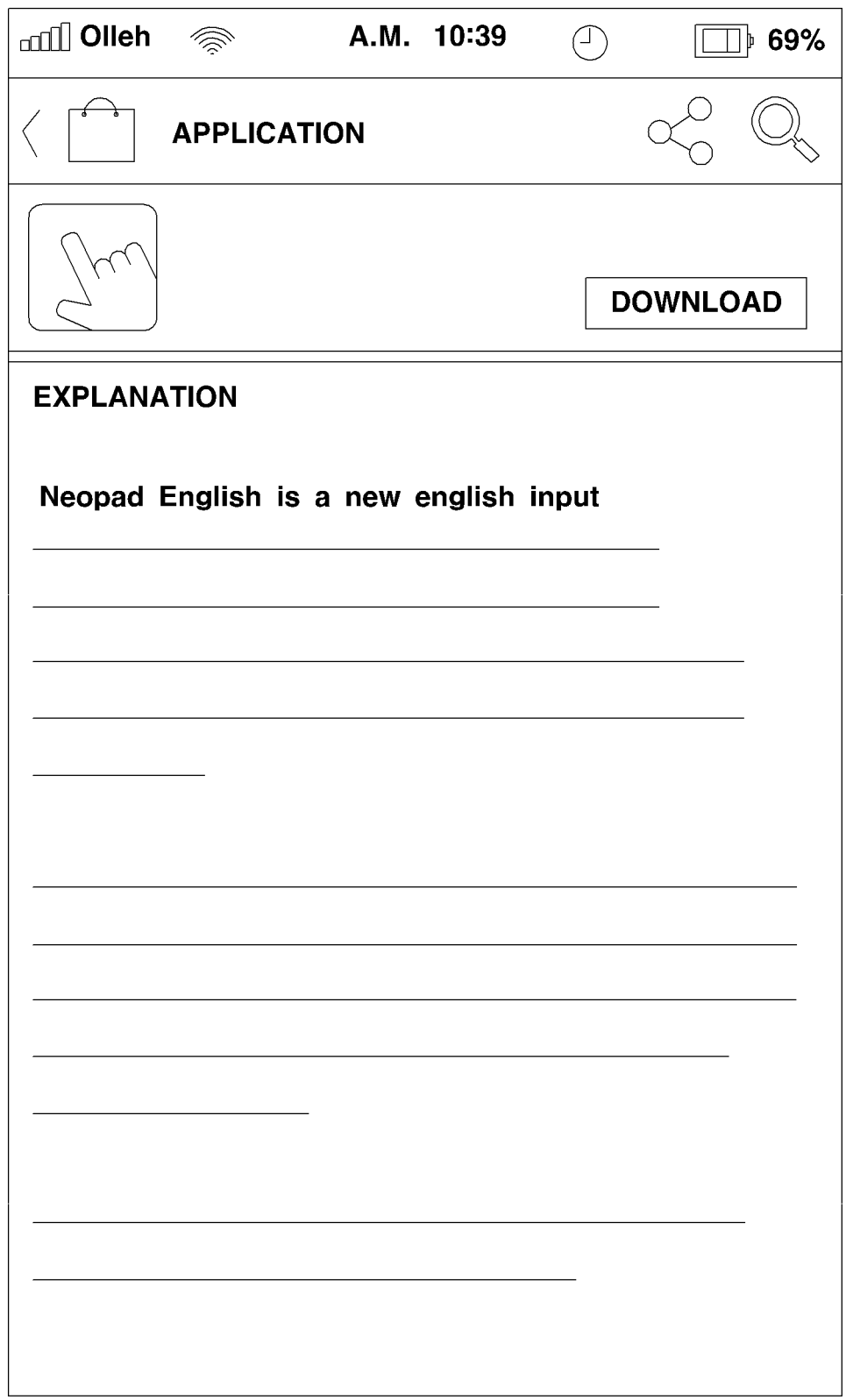
FIG. 7 is a diagram illustrating an example of an explanatory note of an application in the Android Market.

FIG. 7 illustrates an example of an explanatory note of an application in the Android Market. Referring to FIG. 7, it can be seen that a title name "Neopad English" is written in the first line of an explanatory note. That is, it can be seen that a title of the application may also be obtained from contents of the explanatory of the application.

Figure 8:
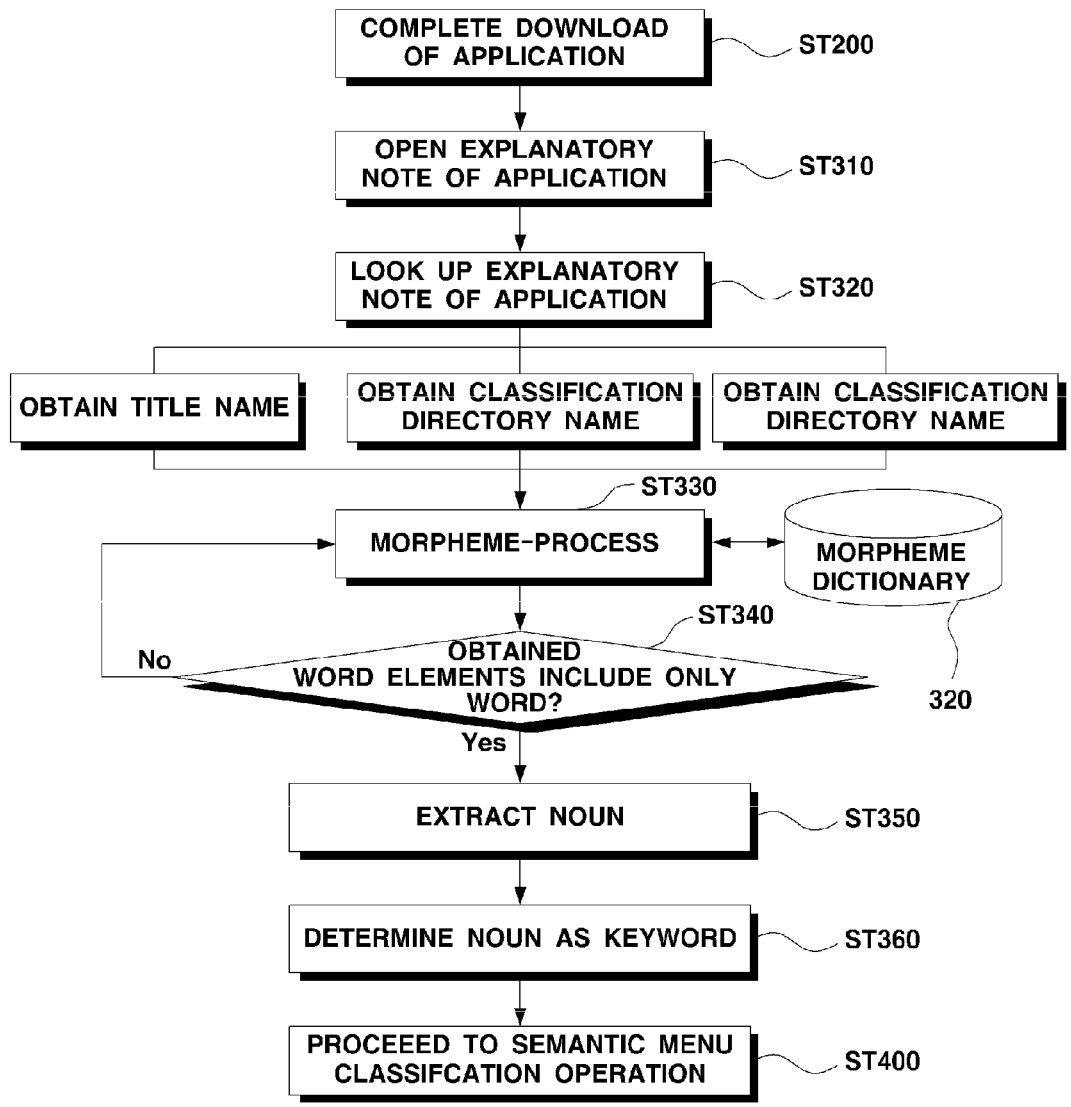
FIG. 8 is a flowchart illustrating an example of a process of extracting a keyword from an explanatory note of an application.

FIG. 8 is a flowchart illustrating a process of extracting a keyword from an explanatory note of an application. Referring to FIG. 8, when the download (or designation) of the application is completed (ST200), the keyword extraction module 125 then opens the explanatory note attached to the application (ST310). Further, the keyword extraction module 125 looks up the explanatory note of the application, and obtains a title name, a category directory name, or a keyword tag of the application (ST320).

For example, in the example of FIG. 6, the title name "basis of jQuery" is extracted. In the example of FIG. 7, the title name "Neopad English" may be extracted. In addition to the title name, the classification directory name, the keyword tag, and the like may be additionally extracted.

Next, the keyword extraction module 125 morpheme-processes the obtained elements (ST330). As exemplified with reference to FIG. 5, the morpheme engine is used and the morpheme dictionary 320 is referred to for the morpheme-processing. After the morpheme-processing, the keyword extraction module 125 determines whether the obtained word elements are formed of only words (ST340), and when the obtained word elements are formed of only words, the keyword extraction module 125 extracts a noun from the obtained word elements (ST350).

Then, the keyword extraction module 125 determines the noun extracted by the morpheme-processing as a keyword (ST360), and performs the semantic menu classification operation (ST400).

The series of keyword extraction processes may be performed on all of the elements obtained in operation ST320, and the keyword extraction module 125 may extract and determine a plurality of keywords, not a single keyword. For example, in the example of FIG. 6, the keyword extraction module 125 morpheme-processes "basis of jQuery", and then finally determines nouns "jQuery" and "basis" as the keywords.

Figure 9:
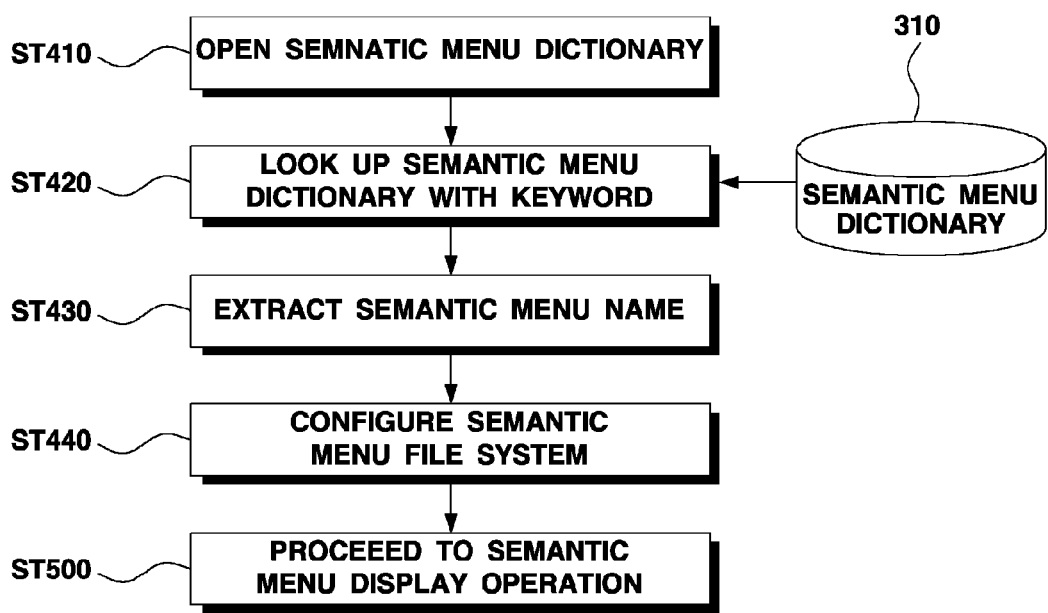
FIG. 9 is a flowchart illustrating an example of a process of classifying a semantic menu in the present invention.

FIG. 9 is a flowchart illustrating an example of a process of classifying a semantic menu in the present invention. Referring to FIG. 9, the semantic menu classification module 130 opens the semantic menu dictionary 310, and starts the process of classifying a semantic menu (ST410). Then, the semantic menu classification module 130 looks up the semantic menu dictionary 310 by using the keyword extracted and determined in the keyword extraction process as a search keyword (ST420). The semantic menu classification module 130 extracts a semantic menu name matched to the search keyword according to a result of the looking-up of the semantic menu dictionary 310 (ST430). In this case, when a plurality of keywords is present, the semantic menu classification module 130 may extract a plurality of semantic menu names with the respective keywords as search keywords.

For example, when nouns "jQuery" and "basis" are determined as the keywords in the keyword extraction process, the semantic menu classification module 130 looks up the semantic menu dictionary with the two search keywords. When only "jQuery" is present in the semantic menu dictionary 310 as described below, the semantic menu classification module 130 extracts "jQuery" as a semantic menu name, and "basis" is destroyed.

Then, the semantic menu classification module 130 configures a semantic menu file system with the extracted semantic menu name (ST440). Then, the method proceeds to the semantic menu display operation (ST500).

Figure 10:
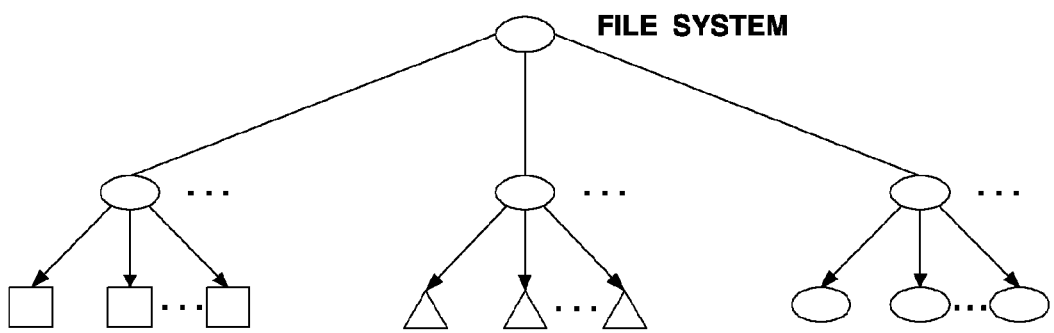
FIGS. 10 and 11 are diagrams illustrating an example of a structure of a semantic menu file system.
Figure 11:
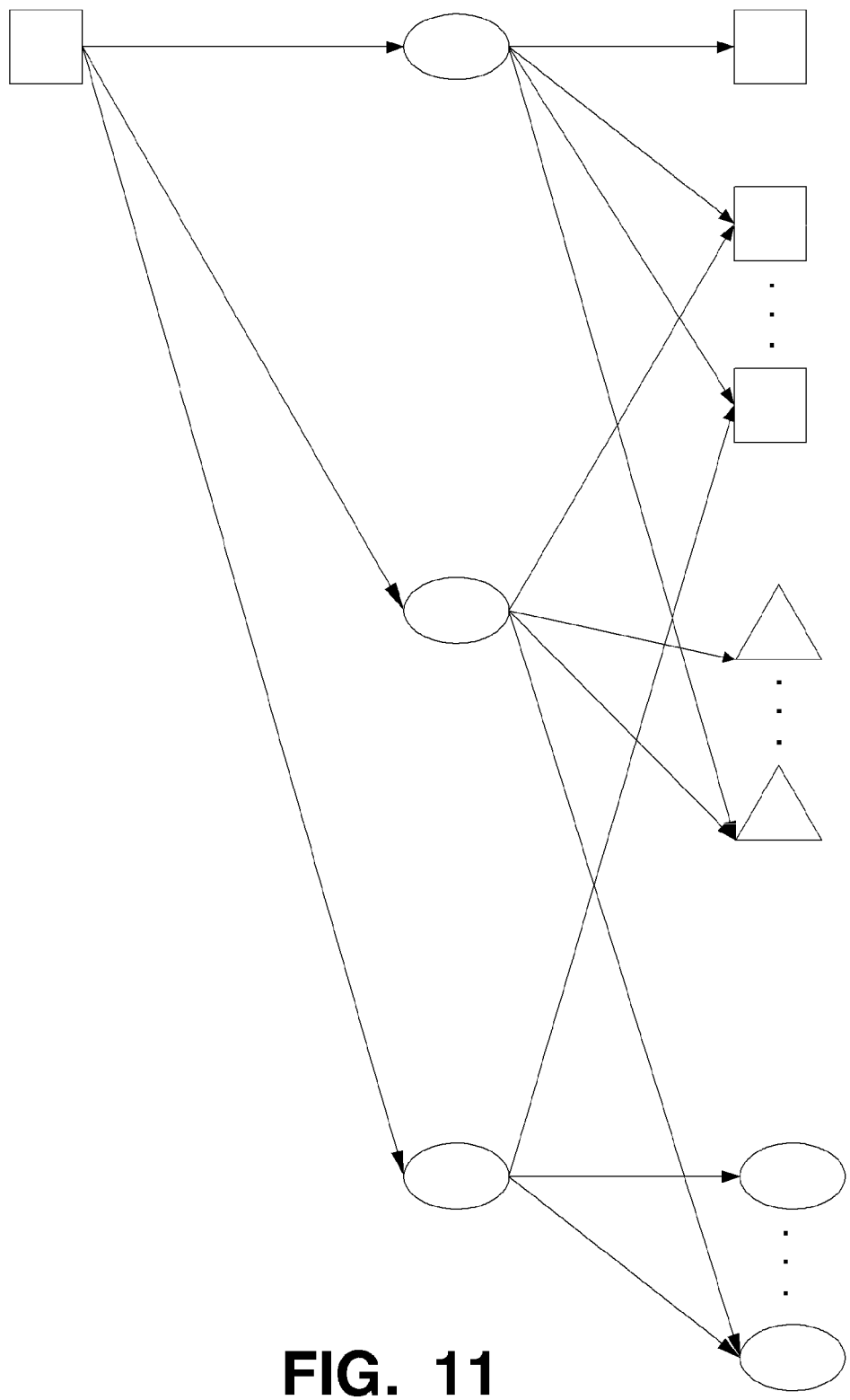

The semantic menu file system has a tree structure as illustrated in FIG. 10 or a network structure as illustrated in FIG. 11. For example, the downloaded application is classified into an element application belonging to the semantic menu name, and a single or a plurality of applications is positioned as elements under the semantic menu name to configure the semantic menu file.

FIG. 12 is a diagram illustrating an example of the semantic menu dictionary. The semantic menu dictionary of FIG. 12 is exemplified in a form of a table for convenience of description, but in an actual method of implementing the semantic menu dictionary, the semantic menu dictionary is created with S/W and the like having a data structure, such as TRIE. The data structure of the semantic menu dictionary 310 is not limited only to the TRIE as a matter of course.

The semantic menu names exemplified in FIG. 12 are menu names registered in the semantic menu dictionary. Preferably, one set of semantic menu names includes about 7 to 12 semantic menu names in an aspect of cognitive science of the user. Further, the semantic menu name may be arbitrarily called or defined by the user. In the example of FIG. 12, the semantic menu names are defined as "U (User interface)", "N (News)", "M (Music)", "A (Album)", "D (Daily to do)", "F (Favorites)", "E (Education)", and the like.

Referring to FIG. 12, the keywords, such as "utility" and "input", are classified as the semantic menu name "U". The keywords, such as "jQuery" and "English", are classified as the semantic menu name "E".

Here, the plurality of semantic menu names may be defined. As illustrated in FIG. 12, the keyword "Utility" is classified as "U" in semantic menu name 1, and is classified as "rose" in semantic menu name 2.

Further, the semantic menu name may be designated or defined by a user, and according to the designation and the definition by the user, the semantic menu name may be designated or defined for each application in real time, and registered in the semantic menu dictionary 310.

For example, a user may define the semantic menu name, such as a family name, a flower name, and a city name, with a metaphorical expression by him/herself, and classify the applications. The semantic menu name according to the user designation method is useful to reflect a preference of the user, and not-expose the menu of the application to others.

Referring to the example of FIG. 12, when nouns "jQuery" and "basis" are extracted as the keywords in the keyword extraction process of FIG. 8, the semantic menu name of "jQuery" is defined as "E" in the semantic menu classification process of FIG. 9, so that "E" is extracted as the semantic menu name of the corresponding application. In the meantime, a keyword corresponding to the other keyword "basis" is not present as a result of the looking-up of the semantic menu dictionary 310, so that "basis" is destroyed.

In the meantime, semantic menu writing date information is included in the semantic menu dictionary 310 of FIG. 12. The semantic menu writing date information is, for example, date information about a "date written". This attribute information may be utilized as application use history information indicating a used time of elements of the semantic menu, that is, the application.

Figure 13:
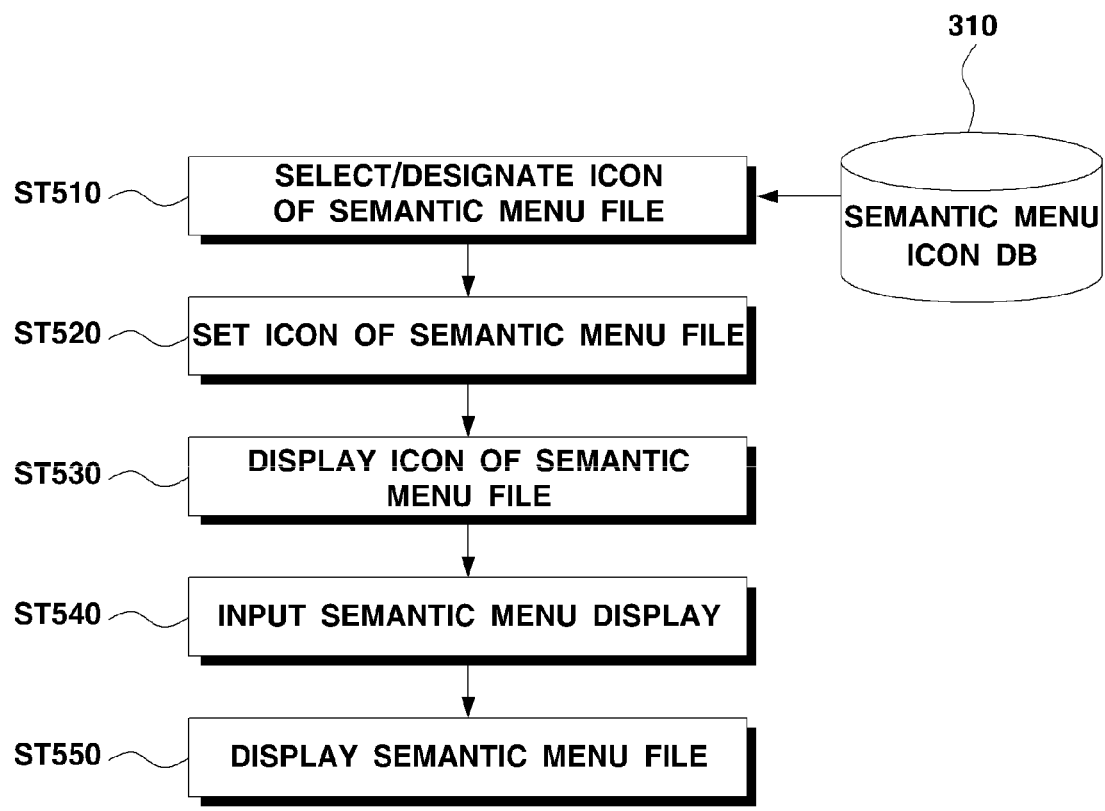
FIG. 13 is a flowchart illustrating an example of a process of displaying a semantic menu in the present invention.

FIG. 13 is a flowchart illustrating an example of a process of displaying the semantic menu. In order to display the semantic menu on the screen, it is necessary to express the semantic menu name in a form of an icon. To this end, a semantic menu icon DB 330, in which pre-drawn graphic icons are stored, is included.

An operation of selecting or designating, by the user, an icon of a semantic menu file from the semantic menu icon DB 330, is started (ST510). The semantic menu icon is a drawing or a picture expressing a natural object, such as a flower, a balloon, a star, and the like as a graphic image. The semantic menu icon may have various shapes and sizes.

In a next operation, when the semantic menu name is extracted for the completely designated or downloaded application through the semantic menu classification process, the semantic menu file icon is automatically set in step S510 (ST520). Then, the set semantic menu file icon is displayed on the smart device (ST530).

Subsequently, when the user selects a semantic menu display input (ST540), the semantic menu file is displayed with the set icon on the smart device (ST550). Here, an action of the user of performing the semantic menu display input is performed by any one of the aforementioned various input methods (such as, the touch input method, the text input method, the voice recognition input method, and the like). For example, when the semantic menu file icon is displayed on the smart device in operation ST530, the user may finally select the semantic menu configuration by tapping the corresponding icon with a touch.

In the present invention, the semantic menu display module 135 may separately assign the lock release function when displaying the semantic menu file. The lock release function is a function provided for the purpose of protecting personal information during the process of displaying the menu configuration by the present invention on the smart device, and may be implemented by hardware and/or software.

Figure 14:
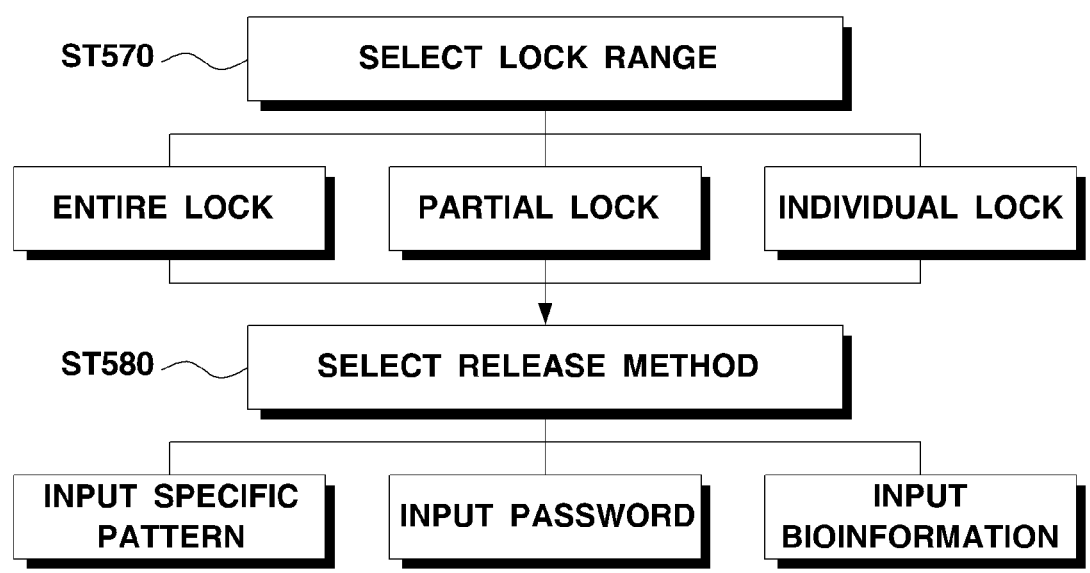
FIG. 14 is a diagram illustrating an example of a lock release function of a semantic menu display.

FIG. 14 is a diagram illustrating an example of the lock release function in the semantic menu display. Referring to FIG. 14, the lock release function of FIG. 14 may be added before the semantic menu file display operation ST550 of FIG. 13.

When the lock release function of the semantic menu is selected in the smart device by the user, the semantic menu display module 135 selects a lock range (ST570). In this operation, any one of an entire lock for the entire semantic menus, a partial lock for a part selected of the semantic menus, and an individual lock for an individual semantic menu is selected. When the partial lock or the individual lock is selected, the semantic menu display module 135 outputs the semantic menu file to the screen together with a selection window for selecting the semantic menu to be locked. Further, the semantic menu file to be partially locked or individually locked is selected by selection of the user.

Next, a release method of releasing the lock is selected (ST580). For example, as the release method, any one of a pattern method, in which the semantic menu file is locked and released by a specific pattern, a password method, in which the semantic menu file is locked and released by a password input, and a bio-signal method, in which the semantic menu file is locked and released by a bio-signal, such as a voice or a fingerprint is selected. Further, when any one is selected from the respective release methods, the semantic menu display module 135 outputs a window for inputting a specific pattern, a window for inputting a password, or a window for inputting bio-information to the screen, and receives release information.

The present invention assigns the lock release function for the semantic menu file in the semantic menu display, thereby limiting access to a specific application or specific contents and protecting privacy for personal information. The application individual protection system has a technical advantage different from the setting of security for the whole use in the smart phone and the like.

For example, when a user losing a smart phone makes access to the smart phone be unavailable through the entire lock, there is a bare chance that the user receives a contact call from a person acquiring the smart phone. However, when the user does not set the lock system, there is a high risk that personal information leaks. However, when the user sets the lock only for the semantic menu file including important personal information according to the present invention, a call function of the smart phone is maintained, so that the user may receive a contact call from a person acquiring the smart phone when the user loses the smart phone, and personal information for important applications may be prevented from leaking. Further, the lock function is set for a semantic menu file having high importance by the release method different from the lock provided by the smart phone, thereby achieving a multi-level security effect.

In the above exemplary embodiment, the method and the system for configuring the menu of the present invention have been described based on the case of the download of the application as an example. However, as noted in the beginning, the method and the system for configuring the menu of the present invention may be applied to the case of the designation of the application. The examples of FIGS. 15 and 16 show that the method and the system for configuring the menu of the present invention may be applied to the case of the designation of the application, such as the bookmark, the bookmark view, and the bookmark execution.

Figure 15:
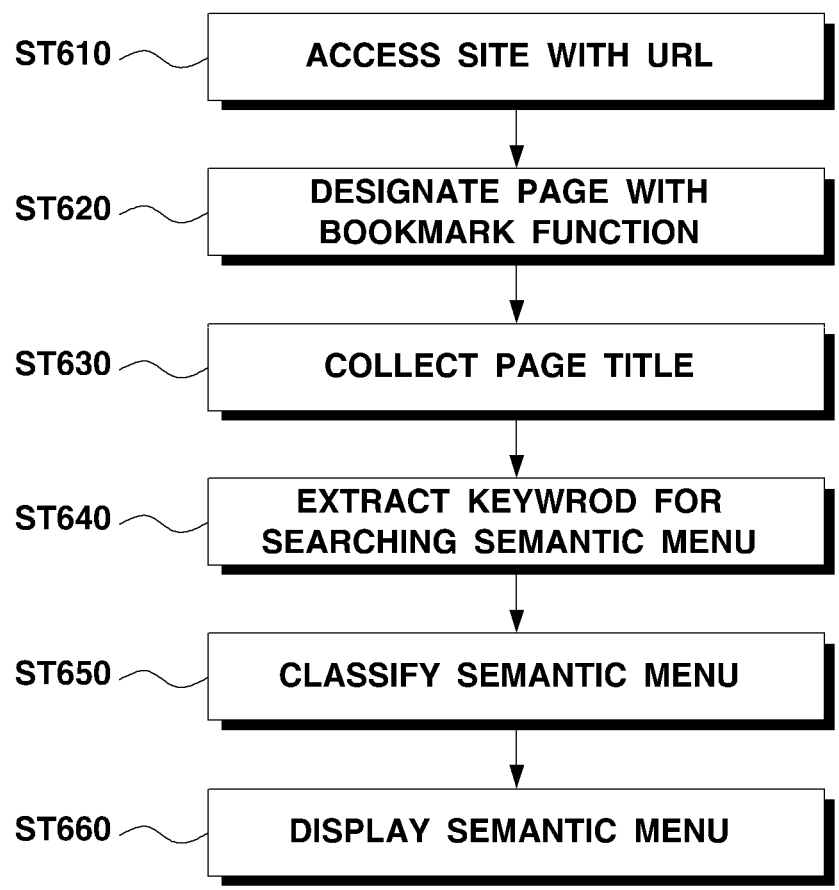
FIG. 15 is a flowchart illustrating an example of a bookmark menu configuration using the present invention.

FIG. 15 illustrates an example of a case where the semantic menu configuration of the present invention is applied to a bookmark menu configuration of a web site. First, a user accesses a web site with a URL in a general home PC (ST610). A web page desired to be connected through a bookmark function provided by the Internet Explorer is designated (ST620). Then, the keyword extraction module 125 of the present invention collects information, such as a page title, from the designated web page (ST630). Further, as illustrated in FIG. 4, the keyword extraction module 125 extracts a keyword for searching for a semantic menu (ST640), classifies the extracted keyword as a semantic menu (ST650), and displays the classified semantic menu (ST660). The collection of the title of the web page, the extraction of the keyword, the classification of the semantic menu, and the display of the semantic menu are the same as the processing processes described in the aforementioned exemplary embodiment.

Figure 16:
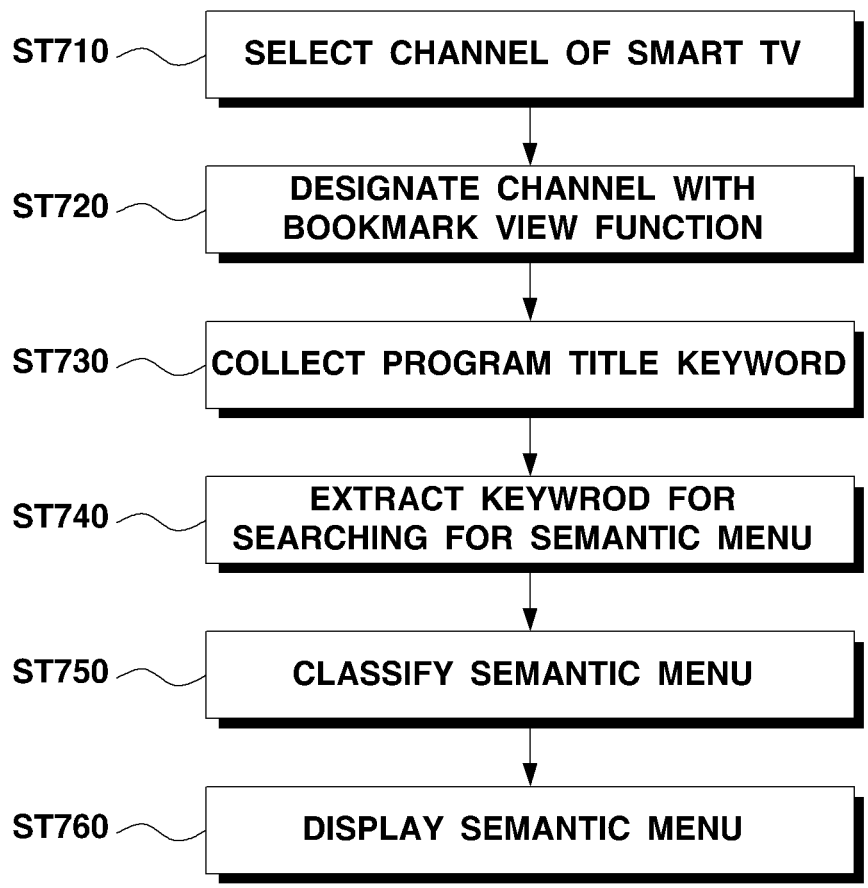
FIG. 16 is a flowchart illustrating an example of a bookmark viewing menu configuration using the present invention.

FIG. 16 illustrates an example of a case where the semantic menu configuration of the present invention is applied to a bookmark view channel selection menu configuration of a smart TV. First, a channel is selected in the smart TV (ST710). Further, the channel is designated through a bookmark view function provided by the smart TV (ST720). Then, the keyword extraction module 125 of the present invention collects information, such as a title, from the designated channel (ST730). Further, as illustrated in FIG. 4, the keyword extraction module 125 extracts a keyword for searching for a semantic menu (ST740), classifies the extracted keyword as a semantic menu (ST750), and displays the classified semantic menu (ST760). The collection of the title of the bookmark view channel, the extraction of the keyword, the classification of the semantic menu, and the display of the semantic menu are the same as the processing processes described in the aforementioned exemplary embodiment.

Figure 17:
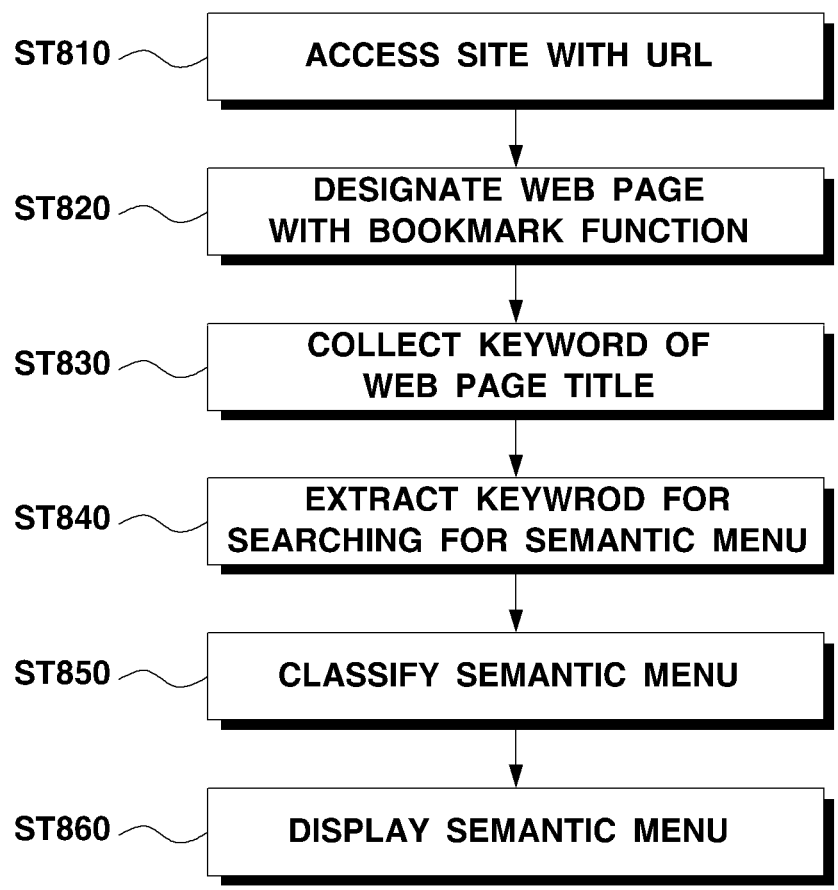
FIG. 17 is a flowchart illustrating an example of a bookmark execution menu configuration using the present invention.

FIG. 17 illustrates an example of a case where the semantic menu configuration of the present invention is applied to a bookmark execution menu configuration of a web service provided by a specific site (for example, a case where contents are played or an application is executed through a web service). First, a user accesses a web site with a URL in a smart pad or other Internet usable PCs (ST810). Then, a web service provided by a web service provider and the like is designated as a bookmark execution function (ST820). Then, the keyword extraction module 125 of the present invention collects information, such as a service title, from the designated web service (ST830). Further, as illustrated in FIG. 4, the keyword extraction module 125 extracts a keyword for searching for a semantic menu (ST840), classifies the extracted keyword as a semantic menu (ST850), and displays the classified semantic menu (ST860). The collection of the title of the web service, the extraction of the keyword, the classification of the semantic menu, and the display of the semantic menu are the same as the processing processes described in the aforementioned exemplary embodiment.

As discussed above, the case where the semantic menu configuration of the present invention is applied to the configuration of the menu by designating a specific application, such as the bookmark, the bookmark view, the bookmark execution, is different from the case where the semantic menu configuration of the present invention is applied to the configuration of the menu by downloading the application in an initial access target and whether the application is downloaded, but the processing process for configuring the semantic menu is the same.

As described above, when the semantic menu configuration of the present invention is applied to the configuration of the menu, such as the bookmark, the bookmark view, and the bookmark execution, a keyword is automatically extracted from a web site, a TV channel, a web service, and the like designated by a user, and a semantic menu is automatically classified, so that the menus of the bookmark, the bookmark view, and the bookmark execution are managed, unlike the case where a user manually creates a folder and manually manages web sites designated through the bookmark, the bookmark view, and the bookmark execution in the related art. Accordingly, it is possible to perform user-oriented and user experience (UX)-based creative management of the menus, such as the bookmark, the bookmark view, and the bookmark execution.

Figure 18:
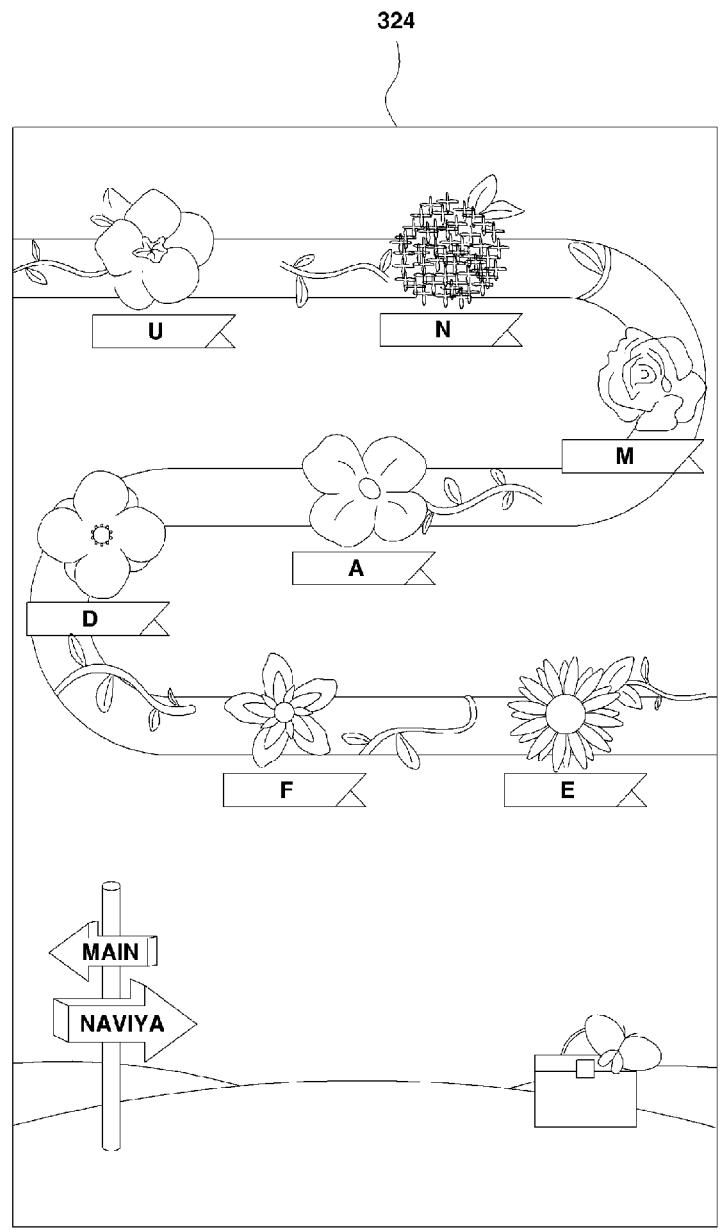
FIG. 18 is a diagram illustrating an example of a semantic menu display screen configured by the present invention.

FIG. 18 is a diagram illustrating an example of a semantic menu display screen configured by the present invention. In the example of FIG. 18, a file configuration in which semantic menu icons are displayed with the kinds of flowers, and "U", "N", "M", "A", "D", "F", and "E" are defined as the semantic menu names in the semantic menu dictionary 310 is illustrated.

In the semantic menu configuration according to the present invention, when a user designates or downloads the application, a keyword is automatically extracted from the application, the semantic menus are classified, and the semantic menus are displayed as illustrated in FIG. 18. Referring to a semantic menu display screen 324 illustrated in FIG. 18, the semantic menu configuration of the present invention is an individual user specialized menu configuration based on user experience by the designation or the setting by the user, unlike a general application menu configuration. Further, the semantic menu is intelligently classified by several setting, such as the designation of the semantic menu name and icon, and the like, without a necessity of manually configuring the menu by a user, so that the semantic menu configuration is the menu configuration having high operability of a menu of an application, searching convenience, and application management by an individual user.

The disclosed invention may be variously modified within the basic spirit of the present invention. That is, all of the aforementioned exemplary embodiments shall be interpreted to be illustrative, and shall not be limitedly interpreted. Accordingly, the scope of the present invention shall be defined according to the accompanying claims, not the aforementioned exemplary embodiments, and when the constituent elements defined in the accompanying claims are substituted with equivalents, this needs to be considered to belong to the scope of the present invention.

The invention claimed is:

1. A method of configuring a menu in a smart device, which configures a menu of an application in a smart device including an information and communication terminal or a content display terminal, the method comprising:
  (a) accessing, by the smart device, a specific place;
  (b) connecting an application designated or download-requested by the smart device to the smart device from the specific place;
  (c) collecting, by the smart device, information about one or more among a keyword, a title, and a tag of the application, and determining the collected information as keywords for searching for a semantic menu;
  (d) classifying, by the smart device, the determined keywords, as the semantic menu; and
  (e) displaying the classified semantic menu on the smart device,
  wherein operation (d) of classifying, by the smart device, the determined keywords, as the semantic menu includes:
  (d-1) opening a semantic menu dictionary;
  (d-2) looking up the semantic menu dictionary by using the keyword determined in operation (c) as a search keyword;
  (d-3) extracting a semantic menu name matched to the search keyword from the semantic menu dictionary; and
  (d-4) configuring a semantic menu file system by including the application in the extracted semantic menu name element, and
  wherein the number of semantic menu names is 7 to 12.

2. The method of claim 1, wherein the smart device includes any one of a smart phone, a smart pad, a smart TV, a PC an IPTV, a navigation device, and an information and communication terminal having a computer function.

3. The method of claim 1, wherein the specific place includes any one of a web site, an application market, a store, a content storage place, and a web service site.

4. The method of claim 1, wherein operation (a) of accessing, by the smart device, the specific place is performed through wired network access, wireless network access, or complex access of a wired network and a wireless network.

5. The method of claim 1, wherein operation (a) of accessing, by the smart device, the specific place is performed by any one input method among a voice recognition input method, a text input method, and a touch input method.

6. The method of claim 1, wherein operation (b) of connecting the application designated or download-requested by the smart device to the smart device from the specific place is performed by designating the application of the specific place or downloading the application, of which the download is requested by the smart device, to the smart device from the specific place by using any one function of a bookmark, a bookmark view, and a bookmark execution of the smart device.

7. The method of claim 1, wherein the application includes at least one of application software, a web application, a web service, a game, music, a picture, a video, text data, and computer processible contents.

8. The method of claim 1, wherein operation (c) of collecting information about the one or more among the keyword, the title, and the tag of the application includes collecting the information about one or more of the keyword, the title, and the tag from a title name provided together with an icon of the application, or a classification directory name or an explanatory note provided by an application provider.

9. The method of claim 1, wherein the semantic menu dictionary is established in a TRIE structure including at least an information element of the keyword of the application, a semantic menu name group, of which designation is available by the user, and a semantic menu writing date.

10. The method of claim 9, wherein the information about the semantic menu writing date is usable as attribute information indicating a use history of the application by the user.

11. The method of claim 1, wherein the configuring of the semantic menu file system in operation (d-4) is implemented in a tree structure or a network structure.

12. The method of claim 1, wherein a lock release function of limiting and releasing access to the semantic menu is added to the semantic menu displayed by operation (e).

13. The method of claim 12, wherein the lock release function is provided so as to select an entire lock for the entire semantic menus, a partial lock for partially selected menus among the semantic menus, and an individual lock for an individual semantic menu.

14. The method of claim 12, wherein the lock release function is provided by any one method among a pattern method, in which the semantic menu is locked and released by a specific pattern, a password method, in which the semantic menu is locked and released by a password input, and a bio-signal method, in which the semantic menu is locked and released by a bio-signal, such as a voice or a fingerprint.

15. The method of claim 1, wherein operation (e) includes:
(e-1) displaying the semantic menu in a form of a semantic menu icon; and
(e-2) displaying the semantic menu icon on the smart device.

16. The method of claim 15, wherein operation (e-1) includes displaying semantic menu icons on the smart device, and displaying an icon designated by the user as a semantic menu icon of a specific semantic menu.

17. The method of claim 15, wherein the semantic menu icon is configured in a form of a graphic drawing or a picture, and is provided to have a shape and a size selected by the user.

18. A method of configuring a menu in a smart device, which configures a menu of an application in a smart device including an information and communication terminal or a content display terminal, the method comprising:
(a) accessing, by the smart device, a specific place;
(b) connecting an application designated or download-requested by the smart device to the smart device from the specific place;
(c) collecting, by the smart device, information about one or more among a keyword, a title, and a tag of the application, and determining the collected information as keywords for searching for a semantic menu;
(d) classifying, by the smart device, the determined keywords, as the semantic menu; and
(e) displaying the classified semantic menu on the smart device,
wherein operation (c) of collecting information about the one or more among the keyword, the title, and the tag of the application includes collecting the information about one or more of the keyword, the title, and the tag from a title name provided together with an icon of the application, or a classification directory name or an explanatory note provided by an application provider,
wherein operation (c) includes:
(c-1) morpheme-processing at least one of the title name provided together with the icon of the application, the classification directory name provided by the application provider and the keyword from the explanatory note by the application provider; and
(c-2) determining at least one of the keyword provided by the application provider and the words obtained through the morpheme-processing as the keyword for searching for the semantic menu, and
wherein the number of semantic menu names is 7 to 12.

19. A method of configuring a menu in a smart device, which configures a menu of an application in a smart device including an information and communication terminal or a content display terminal, the method comprising:
(a) accessing, by the smart device, a specific place;
(b) connecting an application designated or download-requested by the smart device to the smart device from the specific place;
(c) collecting, by the smart device, information about one or more among a keyword, a title, and a tag of the application, and determining the collected information as keywords for searching for a semantic menu;
(d) classifying, by the smart device, the determined keywords, as the semantic menu; and
(e) displaying the classified semantic menu on the smart device,
wherein operation (c) of collecting information about the one or more among the keyword, the title, and the tag of the application includes collecting the information about one or more of the keyword, the title, and the tag from a title name provided together with an icon of the application, or a classification directory name or an explanatory note provided by an application provider,
wherein operation (c) includes:
(c-1) opening the explanatory note;
(c-2) obtaining the title name, the classification directory name, or a keyword tag of the application by looking up the explanatory note;
(c-3) morpheme-processing the obtained title name, classification directory name, or keyword tag; and
(c-4) determining a noun word obtained through the morpheme-processing as the keyword for searching for the semantic menu, and
wherein the number of semantic menu names is 7 to 12.

20. A system for configuring a menu in a smart device, which configures a menu of an application in a smart device for an application designated or download-requested by the smart device including an information and communication terminal or a content display terminal by accessing a specific place, wherein the smart device comprises:

a processor configured to designate an application or request download of an application from the specific place, and manage the designated or downloaded application;

the processor configured to collect information about one or more of a keyword, a title, and a tag of the application, and determine the collected information as keywords for searching for a semantic menu;

the processor configured to classify the semantic menu by using the keyword extracted by the processor; and the processor configured to display the semantic menu classified by the processor on the smart device, wherein the processor looks up a semantic menu dictionary by using the keyword extracted by the keyword extraction processor as a search keyword, extracts a semantic menu name matched to the search keyword from the semantic menu dictionary, and configures a semantic menu file system, and wherein the number of semantic menu names is 7 to 12.

21. The system of claim 20, wherein the smart device includes any one of a smart phone, a smart pad, a smart TV, a PC an IPTV, a navigation device, and an information and communication terminal having a computer function.

22. The system of claim 20, wherein the specific place includes any one of a web site, an application market, a store, a content storage place, and a web service site.

23. The system of claim 20, wherein the accessing, by the smart device, to the specific place is performed through wired network access, wireless network access, or complex access of a wired network and a wireless network.

24. The system of claim 20, wherein the accessing, by the smart device, to the specific place is performed by any one input method among a voice recognition input method, a text input method, and a touch input method.

25. The system of claim 20, wherein the processor designates the application of the specific place or requests and performs download of the application from the specific place by using any one function of a bookmark, a bookmark view, and a bookmark execution.

26. The system of claim 20, wherein the application includes at least one of application software, a web application, a web service, a game, music, a picture, a video, text data, and computer processible contents.

27. The system of claim 20, wherein the processor collects the information about one or more of the keyword, the title, and the tag from a title name provided together with an icon of the application from the specific place, or a classification directory name or an explanatory note provided by an application provider.

28. The system of claim 20, wherein the semantic menu dictionary is established in a TRIE structure including at least an information element of the keyword of the application, a semantic menu name group, of which designation is available by the user, and a semantic menu writing date.

29. The system of claim 28, wherein the information about the semantic menu writing date is usable as attribute information indicating a use history of the application by the user.

30. The system of claim 20, wherein the processor configures the semantic menu file system in a tree structure or a network structure.

31. The system of claim 20, wherein the processor has a lock release function of limiting and releasing access to the semantic menu.

32. The system of claim 31, wherein the lock release function is provided so as to select an entire lock for the entire semantic menus, a partial lock for partially selected menus among the semantic menus, and an individual lock for an individual semantic menu.

33. The system of claim 31, wherein the lock release function is provided by any one method among a pattern method, in which the semantic menu is locked and released by a specific pattern, a password method, in which the semantic menu is locked and released by a password input, and a bio-signal method, in which the semantic menu is locked and released by a bio-signal, such as a voice or a fingerprint.

34. The system of claim 20, wherein the processor displays the semantic menu in a form of a semantic menu icon, and displays the semantic menu icon on the smart device.

35. The system of claim 34, wherein the processor displays an icon designated by the user as a semantic menu icon of a specific semantic menu.

36. The system of claim 34, wherein the semantic menu icon is configured in a form of a graphic drawing or a picture, and is provided to have a shape and a size selected by the user.

37. A system for configuring a menu in a smart device, which configures a menu of an application in a smart device for an application designated or download-requested by the smart device including an information and communication terminal or a content display terminal by accessing a specific place, wherein the smart device comprises:

a processor configured to designate an application or request download of an application from the specific place, and manage the designated or downloaded application;

the processor configured to collect information about one or more of a keyword, a title, and a tag of the application, and determine the collected information as keywords for searching for a semantic menu;

the processor configured to classify the semantic menu by using the keyword extracted by the processor; and the processor configured to display the semantic menu classified by the processor on the smart device, wherein the processor collects the information about one or more of the keyword, the title, and the tag from a title name provided together with an icon of the application from the specific place, or a classification directory name or an explanatory note provided by an application provider, wherein the processor morpheme-processes at least one of the title name provided together with the icon of the application, the classification directory name provided by the application provider and the keyword from the explanatory note by the application provider, and determines at least one of the keyword provided by the application provider and the words obtained through the morpheme-processing as the keyword for searching for the semantic menu, and wherein the number of semantic menu names is 7 to 12.

38. A system for configuring a menu in a smart device, which configures a menu of an application in a smart device for an application designated or download-requested by the smart device including an information and communication terminal or a content display terminal by accessing a specific place, wherein the smart device comprises:

a processor configured to designate an application or request download of an application from the specific place, and manage the designated or downloaded application;

the processor configured to collect information about one or more of a keyword, a title, and a tag of the application, and determine the collected information as keywords for searching for a semantic menu;

the processor configured to classify the semantic menu by using the keyword extracted by the processor; and the processor configured to display the semantic menu classified by the processor on the smart device, wherein the processor collects the information about one or more of the keyword, the title, and the tag from a title name provided together with an icon of the application from the specific place, or a classification directory name or an explanatory note provided by an application provider, wherein the processor obtains the title name, the classification directory name, or a keyword tag of the application from the explanatory note, morpheme-processes the obtained title name, classification directory name, or keyword tag of the application, and extracts the keyword for searching for the semantic menu, and wherein the number of semantic menu names is 7 to 12.

* * * * *